United States Patent [19]
Challberg et al.

[11] Patent Number: 5,960,051
[45] Date of Patent: Sep. 28, 1999

[54] METHODS AND APPARATUS FOR MOVING FUEL BUNDLES IN A NUCLEAR REACTOR

[75] Inventors: Roy C. Challberg, Livermore; David L. Faulstich; Bishara E. Kakunda, both of San Jose; Karim-Panahi Khosrow, Palo Alto, all of Calif.; John D. Wilford, Peterborough, Canada; Richard A. Wolters, San Jose, Calif.; Bernt R. Gaertner; William J. Knowles, both of Peterborough, Canada

[73] Assignee: General Electric Company, Schenectady, N.Y.

[21] Appl. No.: 09/017,943

[22] Filed: Feb. 3, 1998

Related U.S. Application Data

[60] Provisional application No. 60/038,557, Mar. 3, 1997.

[51] Int. Cl.$^6$ ..................................................... G21C 19/20
[52] U.S. Cl. .......................... 376/269; 376/264; 376/253
[58] Field of Search .................................... 376/253, 264, 376/268, 269, 271

[56] References Cited

U.S. PATENT DOCUMENTS 5,687,207  11/1997  Meuschke et al. ..................... 376/264

*Primary Examiner*—Daniel D. Wasil
*Attorney, Agent, or Firm*—Armstrong Teasdale LLP

[57] ABSTRACT

Methods and apparatus for moving fuel bundles in a reactor pressure vessel (RPV) of a nuclear reactor are described. In one embodiment of the apparatus, a support tube facilitates the positioning of a multiple channeled magazine within the RPV, especially at locations adjacent fuel bundles. In the one embodiment, the support tube extends in the reactor pressure vessel into the area above the top guide. A magazine assembly is coupled to the support tube, and includes a magazine having a plurality of fuel bundle receiving channels. The magazine extends from the support tube so that it is adjacent the fuel bundles and the top guide. Grapples extend through the magazine channels, engage the fuel bundles, and retract the bundles into the magazine channels. The magazine and support tube, and thus the bundles, are then moved.

15 Claims, 5 Drawing Sheets

METHODS AND APPARATUS FOR MOVING FUEL BUNDLES IN A NUCLEAR REACTOR

CROSS REFERENCE TO RELATED APPLICATION

This application claims the benefit of U.S. Provisional Application No. 60/038,557, filed Mar. 3, 1997.

FIELD OF THE INVENTION

This invention relates generally to moving fuel bundles in nuclear reactors and, more particularly, to methods and apparatus for enabling the simultaneous movement of at least two fuel bundles within such reactors.

BACKGROUND OF THE INVENTION

A boiling water reactor (BWR) typically includes a reactor pressure vessel (RPV) and a spent fuel pool connected by a channel. In a known BWR, the RPV has a generally cylindrical shape and is closed at both ends, e.g., by a bottom head and a removable top head. A top guide is spaced above a core plate within the RPV, and many other components, e.g., steam dryers and fuel bundles, also are located in the RPV. The fuel bundles include first and second ends and are positioned between the top guide and the core plate.

Loading and removing fuel bundles is performed manually using a refueling mast, a hoist, and winch cables. More specifically, the RPV top head is removed, and other components, such as steam dryers, also are removed to enable access to the fuel bundles. An operator stands on a platform positioned over the RPV and using the main hoist and cables, raises and lowers the refueling mast, which may extend more than thirty (30) feet below the platform into the RPV.

One known refueling mast includes several telescopic sections, and is extended into the RPV until it is adjacent a fuel bundle. A single hook grapple extends through the mast and engages the top of the fuel bundle. The grapple is then retracted so that the fuel bundle is lifted into the mast, and the mast and fuel bundle are lifted above the top guide. Once the mast and fuel bundle clear the top guide, the platform is moved to transfer the fuel bundle to the spent fuel pool.

Due to the inability to move more than one fuel bundle at a time, reloading the RPV can be time consuming. It is desirable, of course, to limit the time required to reload the RPV since the reactor must be shut down during reloads. Reducing the amount of time required to perform such reloading also would facilitate reducing operator radiation exposure.

SUMMARY OF THE INVENTION

These and other objects may be attained by a system for moving fuel bundles in an RPV which, in one embodiment, includes a magazine assembly for simultaneously moving at least two fuel bundles. The magazine assembly, in one embodiment, includes a support tube, a magazine, a magazine drive assembly, a grapple, and a grapple drive assembly. The support tube is configured to extend into the reactor pressure vessel above the top guide, and the magazine assembly is coupled to the support tube. The magazine includes an open top end, an open bottom end, and at least two fuel bundle receiving channels extending between the top end and the bottom end. The channels are each configured to receive a fuel bundle. The magazine drive assembly is coupled to the magazine for controlling vertical and rotational movement of the magazine. The magazine drive assembly, in one form, includes a magazine hoist, a magazine rotation drive, and a magazine hoisting cable. The magazine hoisting cable is connected to and extends between the magazine hoist and the magazine. The magazine hoist controls vertical movement of the magazine, and the magazine rotation drive controls rotational movement of the magazine.

The grapple has two ends, and a hook is located at one end of the grapple. The other grapple end is coupled to the grapple drive assembly. The grapple hook is configured to releasably engage a fuel bundle and to slide within the magazine channels. The grapple drive assembly controls vertical movement of the grapple and grapple hook within the magazine channels. Particularly, the grapple drive assembly is configured to drive the grapple and grapple hook between a first position in which the grapple and the grapple hook extend through a channel, and a second position in which the grapple and grapple hook are completely retracted from the channel.

In operation, the magazine is positioned adjacent a first fuel bundle, and a first magazine channel is aligned with the first fuel bundle. The grapple drive assembly drives the grapple through the first magazine channel, and the grapple hook engages the first fuel bundle. The grapple drive assembly then retracts the grapple through the first magazine channel, and positions the first fuel bundle within the first magazine channel. The grapple is then disengaged from the first fuel bundle. The magazine drive assembly then rotates the magazine and aligns a second magazine channel with a second fuel bundle. The grapple then extends through the second magazine channel and engages the second fuel bundle. The grapple drive assembly retracts the grapple, and positions the second fuel bundle within the second magazine channel. The first and second fuel bundles then are simultaneously moved within the RPV.

By using the above described apparatus, at least two fuel bundles can be moved simultaneously within the RPV. By enabling simultaneous movement of at least two bundles within the reactor, such apparatus facilitates reducing the time required to reload the RPV. Reducing reload time facilitates reducing the reactor shut-down time and the operator radiation exposure per task.

DETAILED DESCRIPTION OF THE DRAWINGS

Figure 1:
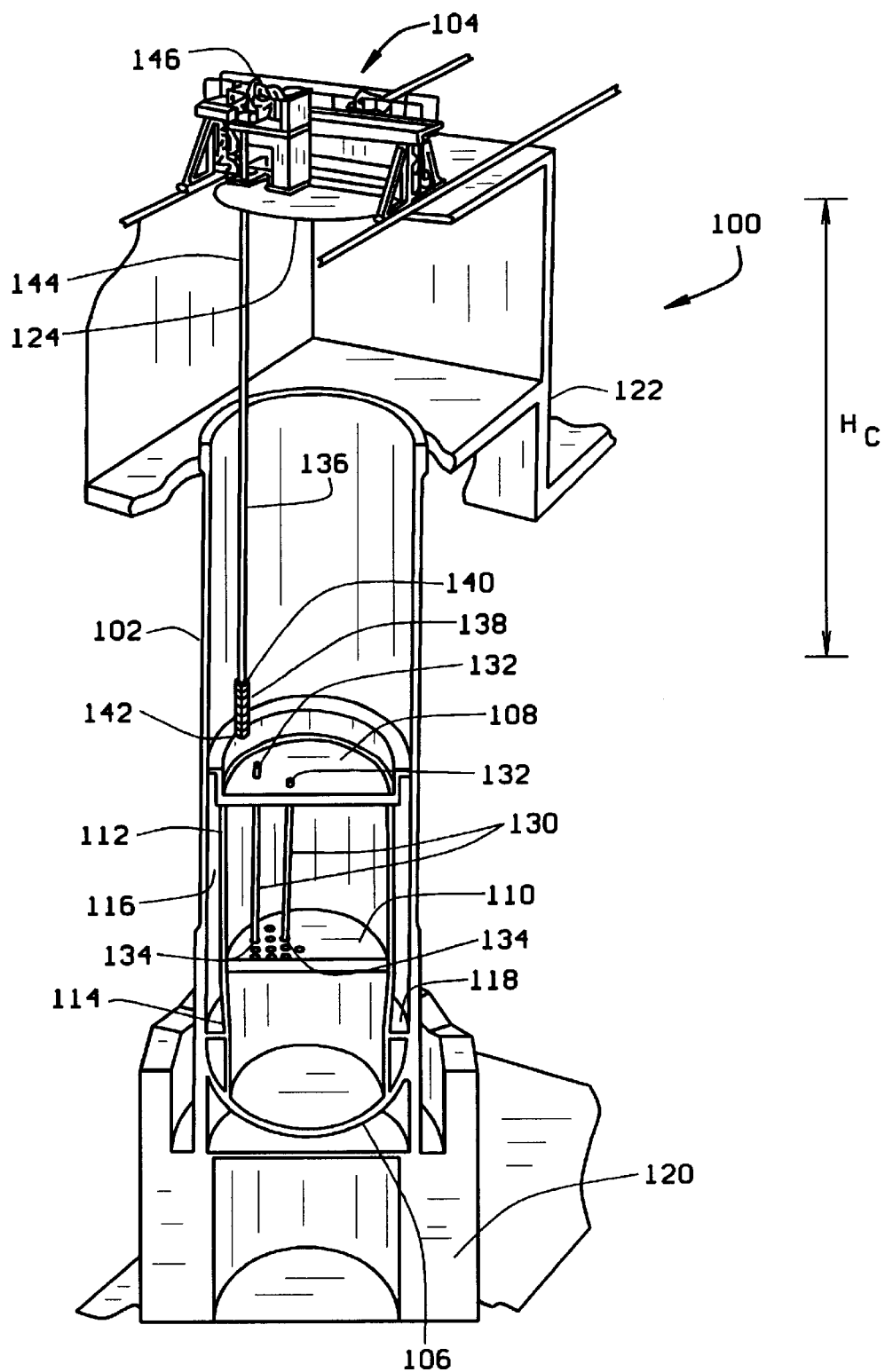
FIG. 1 is a schematic, partial cross-sectional view of a reactor pressure vessel and a reloading bridge of a boiling water reactor.

FIG. 1 is a schematic, partial cross-sectional view of a boiling water reactor 100 including a reactor pressure vessel (RPV) 102 and a platform 104. RPV 102 has a generally cylindrical shape and is closed by a bottom head 106 and a removable top head (not shown). A top guide 108 is spaced above a core plate 110 within RPV 102. A shroud 112 surrounds core plate 110 and is supported by a shroud support structure 114. An annulus 116 is located between shroud 112 and the wall of RPV 102. A baffle plate 118, which has a ring shape, extends around RPV 102 between shroud support structure 114 and the wall of RPV 102. RPV 102 is supported by an RPV support structure 120 and RPV 102 extends into an upper containment 122. Upper containment 122 and RPV 102 are, of course, filled with water. A water level 124 is shown as being just below platform 104.

Boiling water reactor 100 also includes a spent fuel pool and a transfer canal (not shown in FIG. 1). The transfer canal includes a bottom wall positioned at a distance $H_C$ below water level 124, and provides a path from RPV 102 to the spent fuel pool. To transfer components between RPV 102 and the spent fuel pool, such components must, of course, be elevated above RPV 102 and position $H_C$ of the bottom wall of the transfer canal. After such components are properly elevated, the components may then be transferred, via the transfer canal, between RPV 102 and the spent fuel pool.

RPV 102 is shown in FIG. 1 as being shut down with many components removed. For example, and in operation, many fuel bundles 130 are located in the area between top guide 108 and core plate 110. Each fuel bundle 130 includes a top end 132 and a bottom end 134, and is positioned substantially between top guide 108 and core plate 110. In addition, and in operation, steam dryers and many other components (not shown) are located in the area above top guide 108.

It should be understood that the present invention is not limited to practice in reactor 100 and the present invention could be used in many different reactors having many different alternative configurations. Reactor 100 is illustrated by way of example only and not by way of limitation.

As shown in FIG. 1, and in accordance with one embodiment of the invention, a support tube 136 extends into RPV 102 above top guide 108. A magazine 138 having a top end 140 and a bottom end 142 extends from support tube 136 so that bottom end 142 is adjacent top guide 108. To move fuel bundles within boiling water reactor 100, support tube 136 is lowered into the position shown in FIG. 1 by using a cable 144 and a winch 146 mounted to bridge 104. Particularly, support tube 136 is lowered into the area above top guide 108 and positioned so that magazine 138 is substantially aligned with a fuel bundle 130 to be moved. Accordingly, when magazine 138 extends from support tube 136, bottom end 142 of magazine 138 is adjacent fuel bundle 130. Fuel bundle 130 is then loaded into magazine 138. The positioning of the magazine 138 within RPV 102 and the configuration of magazine 138 are described hereinafter in more detail.

Figure 2A:
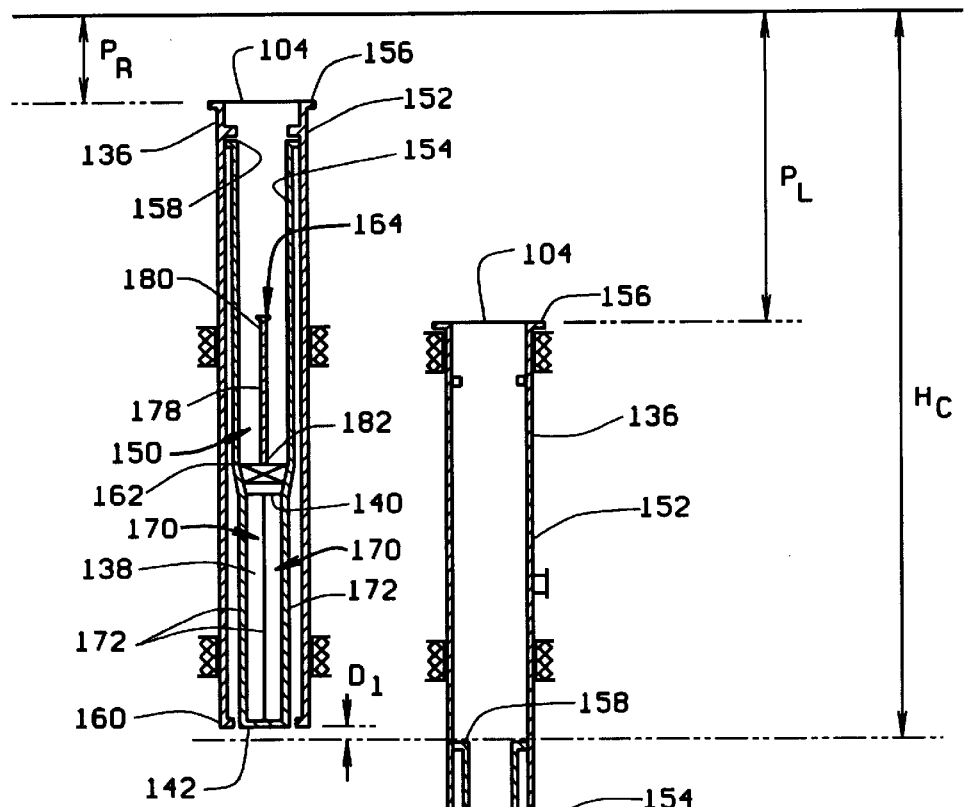
FIGS. 2a and 2b are partial cross-sectional views of a support tube and a magazine assembly in accordance with one embodiment of the present invention.
Figure 2B:
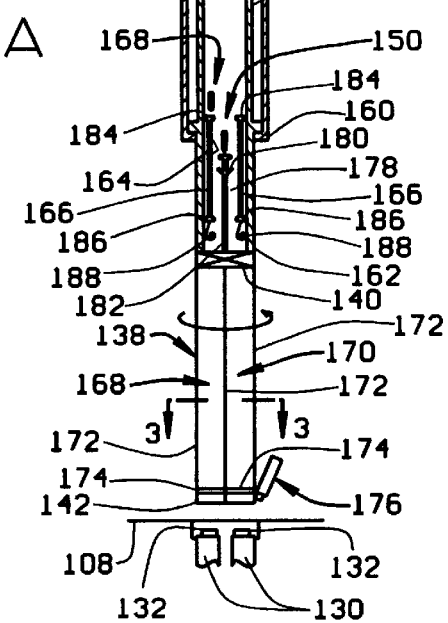

FIGS. 2a and 2b are partial cross-sectional views of support tube 136 and a magazine assembly 150. Support tube 136 includes telescopic outer section 152 and telescopic inner section 154. Each section 152 and 154 has a respective top end 156 and 158 and a respective bottom end 160 and 162. As explained above, a cable and winch vertically move telescopic outer section 152 between a raised position, e.g., a distance $P_R$ from platform 104, as shown in FIG. 2a, and a lowered position, e.g., a distance $P_L$ from platform 104, as shown in FIG. 2b. In the raised position, bottom end 160 of section 152 is elevated at a distance $D_1$ above the bottom of the transfer canal. Particularly, bottom end 160 is approximately 1 foot above the transfer canal. In the lowered position, bottom end 160 of section 152 is below the bottom of the transfer canal.

Magazine assembly 150 is coupled to support tube 136. Particularly, magazine assembly 150 is coupled to, and positioned in inner section 154 of, support tube 136. Magazine assembly 150 includes magazine 138, a magazine drive assembly 164, four grapples 166 (only two grapples 166 are shown in FIGS. 2a and 2b), and a grapple drive assembly 168. Magazine 138 includes top end 140, bottom end 142, and at least two fuel bundle receiving channels 170. Specifically, magazine 138 includes four walls 172 (only three walls 172 are shown in FIGS. 2a and 2b) which define four channels 170 (only two channels 170 are shown in FIGS. 2a and 2b). Each channel 170 is sized to receive a fuel bundle 130. Magazine 138 also includes fuel latches 174 at bottom end 142 for obstructing channels 170 (only two latches 174 are shown in FIGS. 2a and 2b). In addition, magazine 138 includes a position imaging system 176 for facilitating positioning magazine 138. Position imaging systems 176 for use in nuclear reactor environments are well known.

Magazine drive assembly 164 is coupled to magazine 138, and is configured to control vertical and rotational movement of magazine 138. As shown in FIGS. 2a and 2b, magazine drive assembly 164 is positioned substantially coaxially within support tube 136. Magazine drive assembly includes a magazine hoist and a rotating drive (not shown in FIGS. 2a and 2b) and a magazine hoisting cable 178. Magazine hoisting cable 178 is coupled at a first end 180 to the magazine hoist and is coupled at a second end 182 to magazine 138. Particularly, second end 182 of magazine hoisting cable 178 is coupled to top end 140 of magazine 138. Accordingly, magazine drive assembly 164 controls vertical movement of magazine 138. In addition, magazine drive assembly 164 controls rotation of magazine 138 about an axis of rotation which extends between top end 140 and bottom end 142 of magazine 138. Particularly, magazine drive assembly 164 controls magazine 138 rotation within inner telescopic section 154 and controls vertical movement of magazine 138 relative to outer telescopic section 152.

Grapples 166 are located within respective magazine channels 170, and each grapple 166 includes a first end 184 and a second end 186. First ends 184 of respective grapples 166 are coupled to grapple drive assembly 168. Second ends 186 of respective grapples 166 include hooks 188, and each hook 188 is configured to releasably engage a fuel bundle 130. Grapples 166 and hooks 188 also are configured to slide within respective magazine channels 170.

Grapple drive assembly 168 includes a hoist (not shown) coupled to first ends 184 of respective grapples 166, and is configured to substantially simultaneously drive grapples 166 in a "ganged" fashion. Particularly, grapple drive assembly 168 is configured to drive grapples 166 between a first position wherein grapples 166 and hooks 188 are displaced above magazine 138, and a second position, wherein grapples 166 and hooks 188 extend through respective magazine channels 170. Alternatively, of course, grapple drive assembly 168 may be configured to drive each grapple 166 independently from the other grapples 166.

Figure 3:
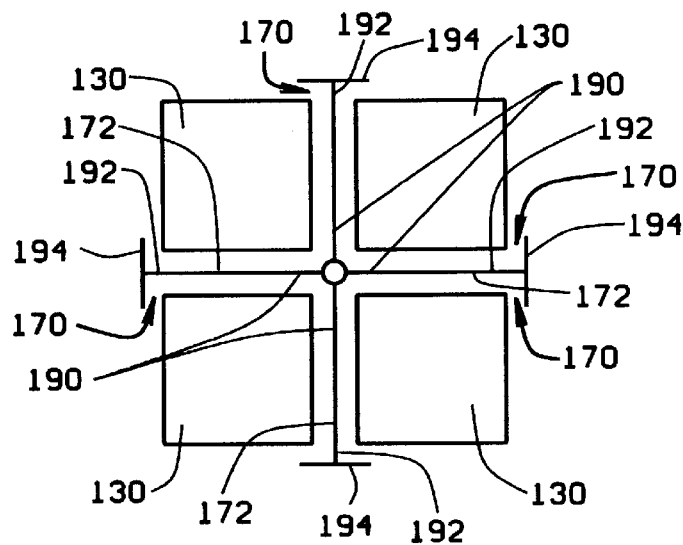
FIG. 3 is a cross-sectional view along line 3—3 shown in FIG. 2b.

FIG. 3 is a cross-sectional view along line 3—3 of magazine 138 of FIG. 2b. Walls 172 each include a first end 190 and a second end 192. Respective first ends 190 of walls 172 are connected to form channels 170 between walls 172. Respective second ends 192 of walls 172 each include substantially transverse portions 194 to facilitate retaining fuel bundles 130. As shown, channels 170 are configured in a 2×2 matrix.

Figure 4:
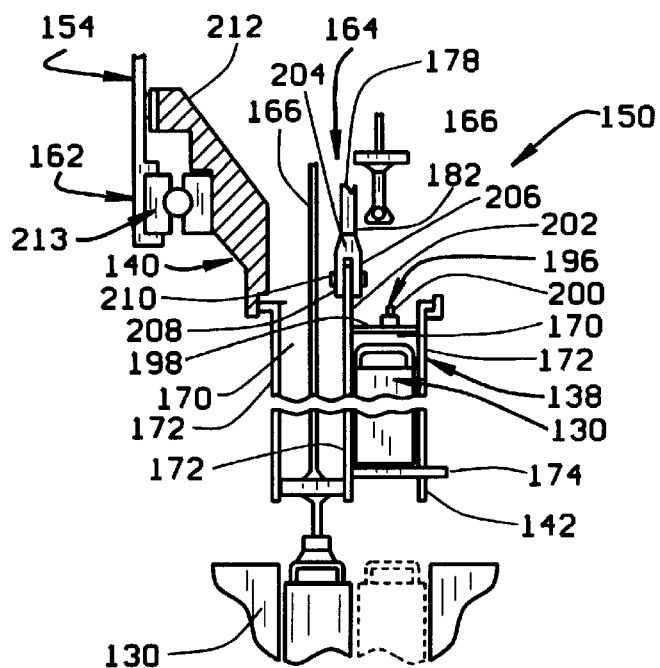
FIG. 4 is a more detailed view of the magazine assembly shown in FIGS. 2a and 2b having a fuel bundle positioned within a magazine channel.

FIG. 4 is a more detailed view of magazine assembly 150 having one fuel bundle 130 positioned within a magazine channel 170. Magazine 158 includes a "closed" fuel latch 174 which partially obstructs magazine channel 170 containing fuel bundle 130. Each fuel latch 174 of magazine 138 is mechanically coupled to grapple drive assembly 168 and moves between a closed position and an open position. When fuel latch 174 is in the closed position, fuel latch 174 at least partially obstructs one of channels 170 adjacent bottom end 142 of magazine 138, and thus secures fuel bundle 130 within channel 170. Conversely, when fuel latch 174 is in the open position, fuel latch 174 does not obstruct channel 170. Furthermore, when fuel latch 174 is in the open position, grapple 166 is substantially prevented from disengaging bundle 130 while bundle 130 is positioned within magazine 138. Particularly, each magazine channel 170 is sized to prevent grapple 166 from disengaging fuel bundle 130 when fuel bundle 130 is positioned within channel 170 and fuel latch 174 is in the open position.

Magazine assembly 150 also includes a sipping system 196 for sipping fuel bundles 130. Sipping system 196 includes a closure plate 198 configured to cover at least one magazine channel 170 adjacent top end 140 of magazine 138. While closure plate 198 illustrated in FIG. 4 covers only one magazine channel 170, closure plate 198 may be configured to cover two or more magazine channels 170. Closure plate 198 includes a connection element 200 providing communication between channel 170 and a defective fuel water sampling system (not shown in FIG. 4). Defective fuel water sampling systems are known.

As also shown in FIG. 4, magazine hoisting cable 178 releasably engages magazine 138. Particularly, top end 140 of magazine 138 includes an engaging element 202, and engaging element 202 includes an opening (not shown) therein. Second end 182 of magazine hoisting cable 178 is configured to releasably engage magazine 138, and includes an engaging portion 204 having two arms 206 and 208. Each arm 206 and 208 has an opening (not shown) therein, and the openings are substantially aligned. Magazine engaging element 202 is configured to slide between arms 206 and 208 of cable engaging portion 204 so that the openings of element 202 and arms 206 and 208 are substantially aligned. A pin 210, is inserted through the aligned openings to releasably engage magazine 138 to second end 182 of magazine hoisting cable 178.

Top end 140 of magazine 138 also includes a flange 212 for coupling magazine 138 to bottom end 162 of inner telescopic section 154, and thus provides further support for magazine 130. Particularly, inner telescopic section 154 includes a bearing 213 adjacent bottom end 162, and flange 212 is configured to couple to bearing 213. Bearing 213 facilitates magazine 138 rotation within inner telescopic section 154, and may, for example, be a ball bearing.

Figure 5:
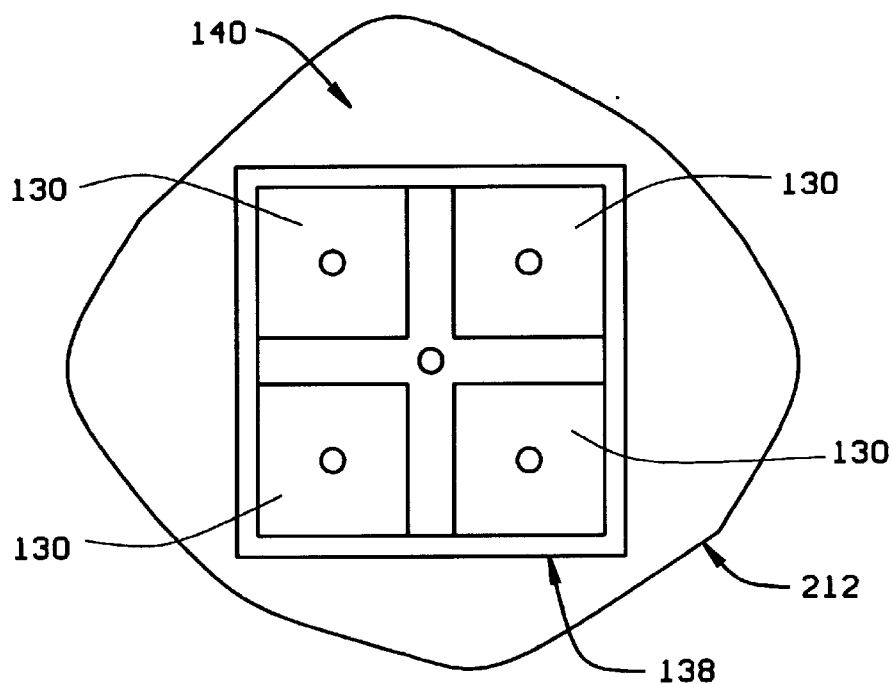
FIG. 5 is a partial top view of the magazine and flange shown in FIG. 4.

FIG. 5 is a partial top view of magazine 138 and flange 212 illustrated in FIG. 4. Flange 212 extends radially outwardly from top end 140 of magazine 138 so that flange 212 couples to, or rests on, bearing 213 (FIG. 4). As also shown in FIG. 5, flange 212 has a substantially circular geometric shape. However, flange 212 may have other geometric shapes, i.e., an oval or polygonal shape.

Figure 6:
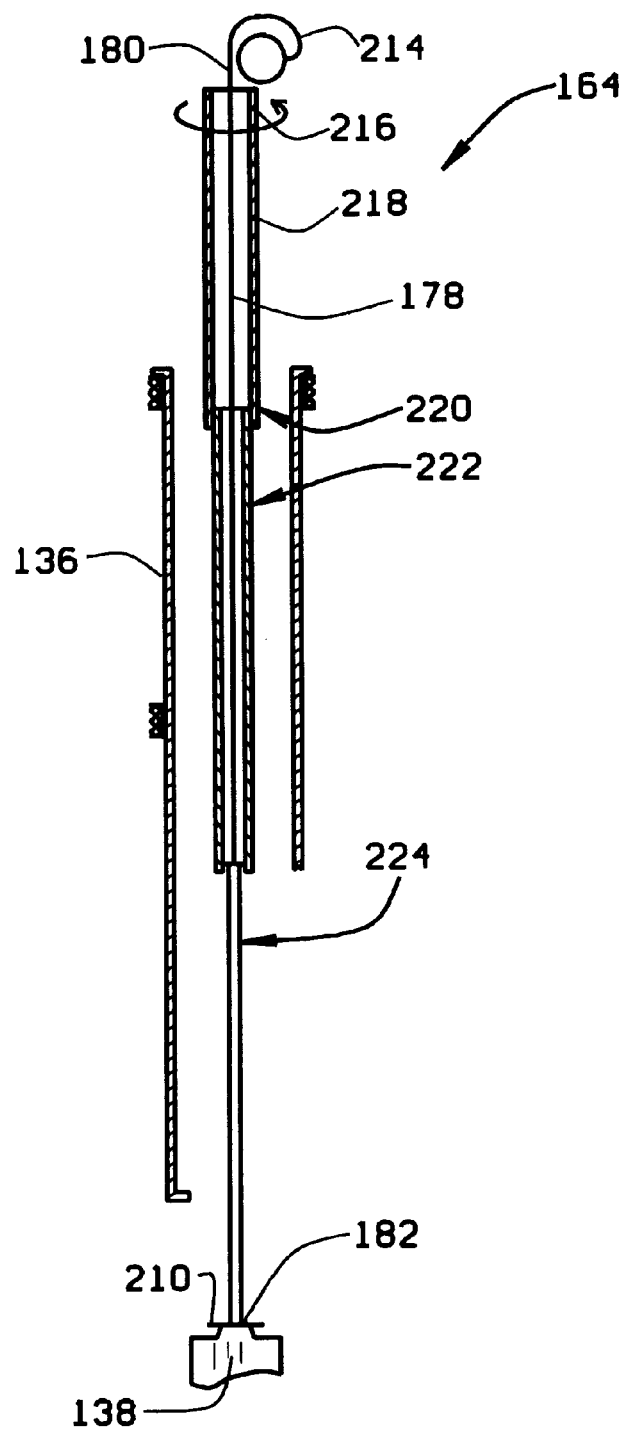
FIG. 6 is a more detailed view of the magazine drive assembly shown in FIGS. 2a and 2b.

FIG. 6 is a more detailed view of magazine drive assembly 164. Magazine drive assembly 164 includes a hoist drive 214, a magazine rotation drive 216, magazine hoisting cable 178, and a magazine hoist support 218. Magazine hoist support 218 and magazine hoisting cable 178 extend substantially coaxially within support tube 136. Magazine hoist support 218 includes telescopic sleeve sections 220, 222 and 224, through which magazine hoisting cable 178 extends. Telescopic sections 220, 222 and 224 may, for example, have either square or rectangular cross sections. The sidewalls of sections 220, 222 and 224, respectively, are substantially thin, and openings (not shown) in sections 220, 222, and 224 may be provided for reducing the weight of magazine hoist support 218. Furthermore, the sidewalls of sections 220, 222 and 224 have sufficient torsional and bending stiffness to permit substantially accurate positioning of magazine 138. Magazine hoisting cable 178, as described above, includes first end 180 and second end 182, and second end 182 releasably engages magazine 138. More specifically, and as shown in FIG. 6, second end 182 of magazine hoisting cable 178 is coupled to telescopic sleeve section 224, and telescopic sleeve section 224 is coupled to magazine 138.

To simultaneously move at least two fuel bundles 130 with magazine assembly 150, at least two fuel bundles 130 first are positioned, e.g., loaded, in magazine channels 170. Magazine assembly 150 is then moved to a desired location. Subsequently, at least one of the fuel bundles is discharged from magazine 138.

To load at least two fuel bundles within magazine 138, support tube 136 and magazine 138 are aligned with a first fuel bundle. Support tube 136 may be moved, for example, using cable 144 and winch 146. Support tube 136 is extended, or lowered, toward top guide 108. Magazine drive assembly 164 then drives magazine hoisting cable 178 and magazine 138 substantially vertically so that bottom end 142 of magazine 138 is adjacent top guide 108. Particularly, inner telescopic section 154 is extended from outer telescopic section 152 so that magazine 138 approaches to guide 108. An empty channel 170, i.e., a channel without a fuel bundle 130 therein, is aligned with the first fuel bundle by rotating magazine 138. Grapple drive assembly 168 then drives one grapple 166 through empty channel 170 so that grapple hook 188 engages the first fuel bundle. Grapple drive assembly 168 then retracts grapple 166 through channel 170 so that fuel bundle 130 is positioned within channel 170 and fuel latch 174 engages to close channel 170. Grapple hook 188 is then disengaged from fuel bundle 130 and retracted from channel 170 so that hook 188 is above top end 140 of magazine 138.

To load a second fuel bundle, and referring again to FIG. 4, an empty channel 170 is aligned with the second fuel bundle. Particularly, magazine 138 again is rotated so that empty channel 170 is aligned with the second fuel bundle, and channel 170 containing the first fuel bundle is not aligned with the second fuel bundle. During rotation, grapples 166 are completely retracted from magazine 138, and may, for example, be secured to support tube 136. Such retraction facilitates rotation of magazine 138. After magazine rotation, grapple drive assembly 168 drives another grapple 166 through empty channel 170 so that grapple hook 188 engages the second fuel bundle. Grapple drive assembly 168 then retracts grapple 166 through channel 170 so that the second fuel bundle is positioned within channel 170 and fuel latch 174 engages to close channel 170. Grapple hook 188 is then disengaged from the second fuel bundle and retracted from channel 170 so that hook 188 is above top end 140 of magazine 138. Third and fourth fuel bundles may be loaded in a similar manner.

To move the fuel bundles, magazine 138 is retracted into support tube 136. Support tube 136 is then retracted from second position $P_L$ to first position $P_R$ so that bottom ends 160, 162 and 142 of outer telescopic section 152, inner telescopic section 154 and magazine 138, respectively, are each elevated above RPV 102 and above the level $H_C$ of the bottom of the transfer canal. Support tube 136 is then moved, via the transfer canal, to the spent fuel pool.

To unload one of the collected fuel bundles 130, support tube 136 is again extended, and magazine drive assembly 164 drives magazine 138 so that bottom end 142 of magazine 138 is adjacent a bottom (not shown) of the spent fuel pool. One of grapples 166 is then extended into a full channel 170 to engage a fuel bundle 130. Fuel latch 174 obstructing such channel 170 is released, and grapple 166 is extended through channel so that fuel bundle 130 abuts the bottom of the spent fuel pool. Grapple 166 then disengages fuel bundle 130, and is retracted. Other fuel bundles 130 are unloaded from magazine 138 in a similar manner.

The above-described assembly facilitates simultaneously moving up to four fuel bundles. However, such assembly is described herein by way of example, and is thus not meant to be limiting. For example, while the magazine described above includes four channels, the magazine may include either more or fewer than four channels. Similarly, while the above-described embodiment illustrates loading and unloading one fuel bundle one at a time, the grapples may be ganged to facilitate simultaneously collecting and discharging a plurality of fuel bundles. Moreover, magazine assembly 150 may be configured to collect full, i.e., pre-loaded, magazines to reduce final bundle collection time.

In addition, the above-described magazine assembly includes four fuel latches. Fewer fuel latches, such as one, two, or three may also be used. For example, and when the magazine includes only one fuel latch, such fuel latch may be configured to simultaneously at least partially obstruct a plurality of magazine channels. Similarly, while the above-described magazine assembly includes one closure plate, more closure plates may be used. For example, magazine assembly may include a closure plate for each channel, e.g., four closure plates to cover four respective channels.

Further, the above-described magazine hoist support includes sleeve type telescopic sections. However, other configurations are possible. For example, the magazine hoist support may include scissors type telescopic sections. Also, the above-described grapple drive assembly includes a hoist for driving the grapples. However, the grapple drive assembly may include other drive mechanisms, e.g., ball screw devices or rack and pinion devices.

Figure 7:
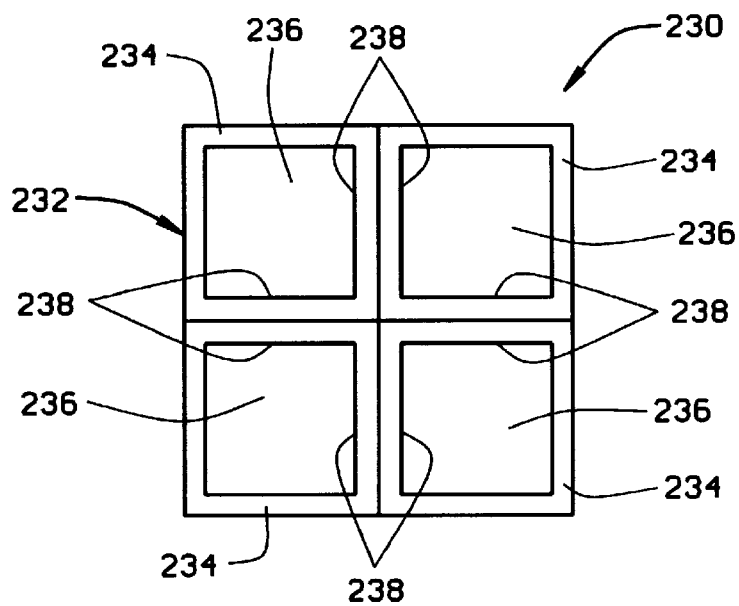
FIG. 7 is a top view of a magazine in accordance with another embodiment of the present invention.

FIG. 7 illustrates a top view of another embodiment of a magazine 230. Particularly, magazine 230 is a "closed" magazine having a top end 232 and bottom end (not shown). Magazine includes four rectangular cylinders 234 defining channels 236 therethrough. As shown, cylinders 234 are substantially secured at sidewalls 238 so that magazine channels 236 are configured into 2×2 matrix. Four channels 238 extend parallel to the sidewall. Accordingly, channels 236 are substantially enclosed. Each channel 236, as described above, is sized to receive a fuel bundle therein.

The above-described magazine assembly includes a magazine having a 2×2 matrix of magazine channels. However, the magazine may include different channel configurations. For example, the magazine may include a linear array, i.e., a 1×N matrix, where N is greater than or equal to 1, of channels. Accordingly, the magazine drive assembly may be configured to move the magazine in a substantially horizontal direction, rather than to rotate the magazine.

It is believed that the above-described assembly facilitates sipping during fuel bundle movement. Accordingly, sipping time is believed to be reduced. The above-described assembly also is configured to be implemented with existing platform systems.

From the preceding description of the present invention, it is evident that the objects of the invention are attained. Although the invention has been described and illustrated in detail, it is to be clearly understood that the same is intended by way of illustration and example only and is not be taken by way of limitation. For example, the magazine described herein includes 4 channels, however the magazine may include a different number of channels, such as 2, 3, or 5 channels. In addition, the magazine described herein is rotatable. However, the magazine may be substantially translatable. Furthermore, the magazine assembly described herein includes four grapples, however, either fewer of more grapples can be used. Moreover, while each grapple described herein is a one hook type grapple, double hook grapples or other multi-hook grapples may be used. Accordingly, the spirit and scope of the invention are to be limited only by the terms of the appended claims.

What is claimed is:

1. A magazine assembly for moving at least one fuel bundle in a nuclear reactor, said assembly comprising:

a magazine comprising at least two fuel bundle receiving channels;

a magazine drive assembly for controlling vertical movement of said magazine;

at least one grapple having a hook, said hook configured to releasably engage at least one fuel bundle and to axially move within at least one of said channels; and a grapple drive assembly for controlling vertical movement of the grapple.

2. A magazine assembly in accordance with claim 1 wherein said magazine drive assembly is further configured to control rotational movement of said magazine.

3. A magazine assembly in accordance with claim 1 wherein said magazine drive assembly is further configured to control horizontal movement of said magazine.

4. A magazine assembly in accordance with claim 1 wherein said magazine comprises four channels.

5. A magazine assembly in accordance with claim 1 wherein said magazine further comprises at least one fuel latch, said fuel latch coupled to said grapple drive assembly and configured to move between a closed position wherein said latch at least partially obstructs one of said magazine channels, and an open position wherein said latch does not obstruct said magazine channel.

6. A magazine assembly in accordance with claim 1 wherein said magazine further comprises a closure plate, said closure plate configured to be connected to a fuel water sampling system and to cover at least one of said channels.

7. A magazine assembly in accordance with claim 1 wherein said magazine drive assembly comprises a magazine hoist, a rotating drive, and a magazine hoisting cable, said magazine hoisting cable having one end coupled to said magazine hoist, said magazine hoisting cable having another end coupled to said magazine.

8. A magazine assembly in accordance with claim 1 wherein said hook is a double hook.

9. A method for moving at least two fuel bundles in a nuclear reactor having a top guide, using a magazine assembly, the magazine assembly including a magazine having a plurality of fuel bundle receiving channels therein, a magazine drive assembly, at least one grapple having a hook, and a grapple drive assembly, said method comprising:

positioning the magazine adjacent the top guide; and loading at least two fuel bundles into respective magazine channels.

10. A method in accordance with claim 9 wherein positioning the magazine adjacent the top guide includes the step of aligning one fuel bundle receiving channel with one fuel bundle.

11. A method in accordance with claim 10 wherein aligning one fuel bundle receiving channel includes the step of rotating the magazine.

12. A method in accordance with claim 9 wherein positioning the magazine adjacent the top guide includes the step of driving the magazine with the magazine drive assembly.

13. A method in accordance with claim 9 further comprising the step of moving the loaded fuel bundles.

14. A method in accordance with claim 13 further comprising the step of unloading the loaded fuel bundles.

15. A method in accordance with claim 9 wherein loading at least two fuel bundles into the magazine channels comprises the step of simultaneously loading two fuel bundles.

* * * * *